(12) United States Patent
Zhang et al.

(10) Patent No.: US 8,081,692 B1
(45) Date of Patent: Dec. 20, 2011

(54) TRANSMIT BEAMFORMING UTILIZING CODEBOOK SELECTION IN A WIRELESS MIMO COMMUNICATION SYSTEM

(75) Inventors: Hongyuan Zhang, Sunnyvale, CA (US); Kedar Shirali, San Jose, CA (US); Arul Durai Murugan Palanivelu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 738 days.

(21) Appl. No.: 12/171,067

(22) Filed: Jul. 10, 2008

Related U.S. Application Data

(60) Provisional application No. 60/949,153, filed on Jul. 11, 2007.

(51) Int. Cl.
*H04K 1/10* (2006.01)
*H04L 27/28* (2006.01)
(52) U.S. Cl. ....................................... 375/260
(58) Field of Classification Search .......... 375/259–260, 375/224; 708/607
See application file for complete search history.

(56) References Cited

U.S. PATENT DOCUMENTS

| | | | | |
|---|---|---|---|---|
| 7,787,554 B1 * | 8/2010 | Nabar et al. | .............. | 375/267 |
| 2008/0014870 A1 * | 1/2008 | Kim | .............. | 455/69 |
| 2008/0187061 A1 * | 8/2008 | Pande et al. | .............. | 375/260 |
| 2008/0212461 A1 * | 9/2008 | Pande et al. | .............. | 370/203 |
| 2008/0219373 A1 * | 9/2008 | Zhang et al. | .............. | 375/262 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology- Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

(Continued)

*Primary Examiner* — Jean B Corrielus

(57) ABSTRACT

A sub-matrix is selected from an estimated multiple input, multiple output (MIMO) channel matrix, wherein the estimated MIMO channel matrix is constructed based on a codebook. A singular value decomposition (SVD) is calculated based on the sub-matrix. A steering matrix is calculated based on the SVD and the codebook.

25 Claims, 7 Drawing Sheets

OTHER PUBLICATIONS

IEEE Std 802.11g/D8.2, Apr. 2003 (Supplement to ANSI/IEEE Std 802.11, 1999 (Reaff 2003) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band,"*The Institute of Electrical and Electronics Engineers, Inc.*, Apr. 2003.

S. A. Mujtaba, "IEEE P802.11—Wireless LANS, TGn Sync Proposal Technical Specification," doc.: IEEE 802.11—04/0889r6, May 2005.

Cavallaro et al., "VLSI Implementation of a CORDIC SVD Processor", Eighth Biennial University/Government/Industry Symposium, pp. 256-260, 1989.

U.S. Appl. No. 12/098,222, filed Apr. 4, 2008 entitled "Reuse of a Matrix Equalizer for the Purpose of Transmit Beamforming in a Wireless MIMO Communication System".

U.S. Appl. No. 12/131,768, filed Jun. 2, 2008 entitled "Method and Apparatus for Selecting a Modulation Coding Scheme".

U.S. Appl. No. 12/044,117, filed Mar. 7, 2008 entitled "Codebook Selection for Transmit Beamforming".

* cited by examiner

TRANSMIT BEAMFORMING UTILIZING CODEBOOK SELECTION IN A WIRELESS MIMO COMMUNICATION SYSTEM

CROSS-REFERENCES TO RELATED APPLICATIONS

The present application claims the benefit of U.S. Provisional Application No. 60/949,153, entitled "Combining Codebook Selection with Simple Closed-Form SVD for Transmit Beamforming," filed on Jul. 11, 2007, which is hereby incorporated by reference herein in its entirety.

FIELD OF TECHNOLOGY

The present disclosure relates generally to wireless communication systems and, more particularly, to an apparatus and method for performing beamforming calculations for a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the IEEE 802.16a Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD). While it is known to perform beamforming in a MIMO system in a manner that uses all of the available receiver and transmitter antennas in the MIMO system, which thereby maximizes transmission reliability, the calculations and processing overhead associated with computing the beamsteering coefficients or the steering matrix increases significantly as the number of transmission and receiver antennas increases. As a result, beamforming in a MIMO system may significantly increase the system complexity and processing overhead when a large number of transmission and receiver antennas are present.

SUMMARY

In one embodiment, a method includes selecting a sub-matrix from an estimated multiple input, multiple output (MIMO) channel matrix, wherein the estimated MIMO channel matrix is constructed based on a codebook. The method also includes calculating a singular value decomposition (SVD) based on the sub-matrix, and calculating a steering matrix based on the SVD and the codebook.

In another embodiment, an apparatus comprises a sub-matrix selector to select a sub-matrix from an estimated multiple input, multiple output (MIMO) channel matrix, wherein the estimated MIMO channel matrix constructed based on a codebook. Additionally, the apparatus comprises a singular value decomposition (SVD) calculator to calculate an SVD based on the sub-matrix, and a steering matrix generator to calculate a steering matrix based on the SVD and the codebook.

In yet another embodiment, an apparatus comprises means for selecting a sub-matrix from an estimated multiple input, multiple output (MIMO) channel matrix, wherein the estimated MIMO channel matrix constructed based on a codebook. Also, the apparatus comprises means for calculating a singular value decomposition (SVD) based on the sub-matrix, and means for calculating a steering matrix based on the SVD and the codebook.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards. Moreover, although the beamforming techniques described herein are described as being used in communication systems utilizing OFDM modulation, these techniques may utilized with a variety of other types of modulation schemes as well.

Figure 1:
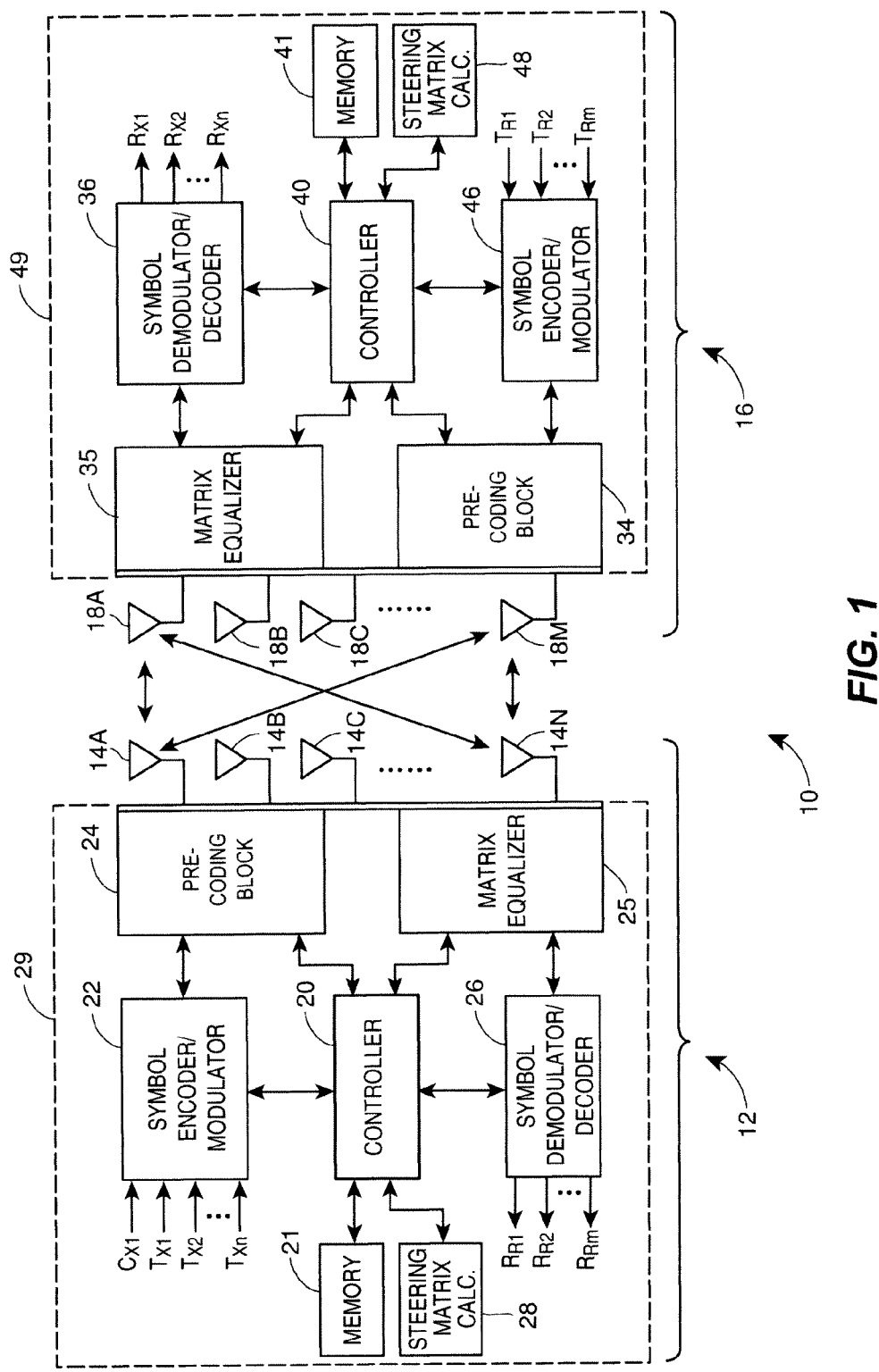
FIG. 1 is a block diagram of a wireless MIMO communication or transmission system that may implement steering matrix calculation techniques.

Referring now to FIG. 1, a MIMO communication system 10 is illustrated in block diagram form as generally including a single transmitter 12 having multiple transmitter antennas 14A-14N and a single receiver 16 having multiple receiver antennas 18A-18M. The number of transmitter antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a precoding block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 20 may be any desired type of controller and both the controller 20 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the precoding block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be referred to as or included within a sounding packet.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the precoding block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the precoding block 24 in accordance with a beamforming technique more specifically described herein. Upon receiving the modulated signals, the precoding block 24 or beamforming network processes the modulated signals by injecting delays and/or gains and/or phase rotations into the modulated signals based on a steering matrix provided by the controller 20, to thereby perform beamsteering or beamforming via the transmitter antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (i.e., sounding packet). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$, which may be encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a precoding block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40 may be stored in the memories 21 and 41.

As is generally known, beamforming or beamsteering typically includes applying appropriate phases and/or gains and/or phase rotations to the various signals as sent through the multiple transmitter antennas 14A-14N, in a manner which causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the precoding block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link).

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission. In the event of explicit beamforming, in this case, the transmitter 12 must first send a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel. Additionally, in the case of implicit beamforming, to avoid the use of multiple communication between a particular transmitter/receiver pair each time a steering matrix is to be computed for the forward channel, the transmitter 12 may determine the CSI or other measured description of the reverse channel, i.e., the channel from the receiver 16 to the transmitter 12, from signal(s) sent from the receiver 16 including, for example the known test or control signal $C_{R1}$. Based on the CSI or other measured description of the reverse channel, the transmitter 12 may calculate the steering matrix for the forward channel.

Development of the steering matrix can be computationally expensive, and may require feedback (in the form of the CSI) from the receiver 16 to the transmitter 12, especially when there are numerous transmitter antennas and receiver antennas. When performing beamforming, it is optimal to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the size of the number of receiver and transmitter antennas increases, the required feedback and number of calculations that need to be performed to develop the optimal steering matrix increases significantly (e.g., exponentially).

To reduce the computational load associated with determining the steering matrix, a codebook selection technique similar to techniques described in U.S. patent application Ser. No. 12/044,117, filed on Mar. 7, 2008, and entitled "Codebook Selection for Transmit Beamforming," (hereinafter referred to as "MP1770"), which is hereby incorporated by reference herein, may be used in combination with a more direct technique, such as singular value decomposition (SVD), to develop the steering matrix. For example, codebook selection may be utilized to reduce the dimensionality of the channel estimate, and then SVD may be utilized to process the channel estimate. Steering matrix calculation techniques that utilize codebook selection in conjunction with SVD will be described in further detail below.

Optionally, to increase efficiency and to reduce the computational load associated with determining the steering matrix further, the system of FIG. 1 may develop a steering matrix using information and/or hardware or software used in either the receiver 16 or the transmitter 12 as part of the matrix equalizer functionality which ultimately reduces the computational load associated with beamsteering. For example, the transmitter 12 (or the receiver 16) may develop the steering matrix by using the computational structure of the matrix equalizer to perform steering matrix calculation or codebook selection operations independent of the matrix equalizer computations. Techniques for utilizing computational resources of a matrix equalizer for steering matrix computation are described in U.S. patent application Ser. No. 12/098, 222, filed on Apr. 4, 2008, and entitled "Reuse of a Matrix Equalizer for the Purpose of Transmit Beamforming in a Wireless MIMO Communication System," (hereinafter referred to as "MP1831") which is hereby incorporated by reference herein.

Here, it is useful to note that the matrix equalizer (of the receiver 16 for example) acts on the estimate of the channel CSI to determine matrix coefficients that help equalize (separate) the (multiple) transmitted signals. A matrix equalizer is an essential component of any MIMO communication system, and is needed for a receiver to recover the transmitted signals. Thus, the computational mechanisms used to perform matrix equalization are needed within the receiver hardware components of a MIMO communication system. However, beamforming is an optional technique, and thus any structure added to perform beamforming adds to the cost and computational load of the hardware/software components of the MIMO communication system. However, because both matrix equalization and beamforming are essentially matrix operations, some of the computing structure provided to implement matrix equalization optionally may be used to implement or perform beamforming or beamsteering operations, thereby enabling both of these operations to be performed using common hardware/software or other computational mechanisms. For example, the matrix equalizer often uses a QR decomposition algorithm to determine the equalizer coefficients, and this QR decomposition algorithm optionally may be reused to perform beamforming computations.

Thus, based on the discussion provided above, it is optional to use the computational structure of a matrix equalizer within a MIMO communication system to perform at least some aspects of the transmit beamforming or beamsteering operations. In this case, the transmit beamforming operations using matrix equalizer structure can be performed in either a receiver or a transmitter of the transmitter/receiver pair in which transmit beamforming is to be used in sending signals from the transmitter to the receiver of the transmitter/receiver pair. Optionally, the steering matrix calculation unit 28 or 48 may use some of the computational structure of the associated matrix equalizer 25 or 35 to compute a beamforming matrix and/or to select vectors or columns from a codebook. In the case in which the matrix equalizer 35 of the receiver 16 is used to perform calculations for explicit transmit beamforming within the transmitter 12, the processing using the matrix equalizer 35 is performed in the receiver 16 to develop the beamforming measure or to develop the steering matrix itself, and the beamforming measure or the steering matrix itself may be sent to the transmitter 12. On the other hand, if the matrix equalizer 25 of the transmitter 12 is used to perform beamforming calculations for transmit beamforming within the transmitter 12, the beamforming calculations may of course be made on information regarding the reverse link collected at the transmitter 12, or on information sent to the transmitter 12 (such as CSI) from the receiver 16. In this case, the matrix equalizer 25 may be used to develop a beamforming measure and the steering matrix calculation unit 28 may then develop the steering matrix from the beamforming measure. Of course, in this case, it will be understood that the beamforming computations made using the structure or algorithms of the matrix equalizer 25 may produce coefficients or other information not related in any way to the coefficients required for equalization of a transmitted signal.

In any event, as discussed above, the matrix equalizer 35 (of the receiver 16) or the matrix equalizer 25 (of the transmitter 12) optionally may be used to perform beamforming calculations for performing transmit beamforming between the transmitter 12 and the receiver 16. If the matrix equalizer 35 of the receiver 16 is used to perform these beamforming calculations, the steering matrix calculation unit 48 may, for example, use the structure of the matrix equalizer 35 to develop appropriate intermediate information needed for determining the transmit steering matrix such as QR decomposition information, CORDIC rotations, codebook selection information, etc. The steering matrix calculation unit 48 may then send this intermediate information to the transmitter 12 for use by the steering matrix calculation unit 28 in forming the transmit steering matrix. On the other hand, if desired, the steering matrix calculation unit 48 may actually form the transmit steering matrix from the intermediate information developed using the matrix equalizer 35 and send this steering matrix to the transmitter 12. Alternatively, if the matrix equalizer 25 of the transmitter 12 is used to perform beamforming calculations, the steering matrix calculation unit 28 of the transmitter 12 may use the structure or algorithms of the matrix equalizer 25 to develop the intermediate information such as QR decomposition information, CORDIC rotations, codebook selection information, etc., and then develop the transmit steering matrix from this information. The steering matrix calculation units 28 and 48 may reuse as much of the components and structure of the matrix equalizers 25 and/or 35 as possible or desired in computing the transmit steering matrix for use by the transmitter 12. It is to be understood, however, that reuse of the components and structure of the matrix equalizers 25 or 35 for transmit beamforming are optional. Thus, in some embodiments, the matrix equalizers 25 or 35 may not be utilized for performing any beamforming computations.

Using computational resources of a matrix equalizer to determine the steering matrix used by a transmitter to perform beamforming in the transmission of a signal to the receiver may reduce the circuitry and/or software for forming the steering matrix, may reduce the complexity of the hardware and/or the software used to implement the transmitter and/or the receiver and may also increase the speed at which the transmitter is able to transmit information or adapt to new channel conditions based on the receipt of new or updated CSI.

Figure 2:
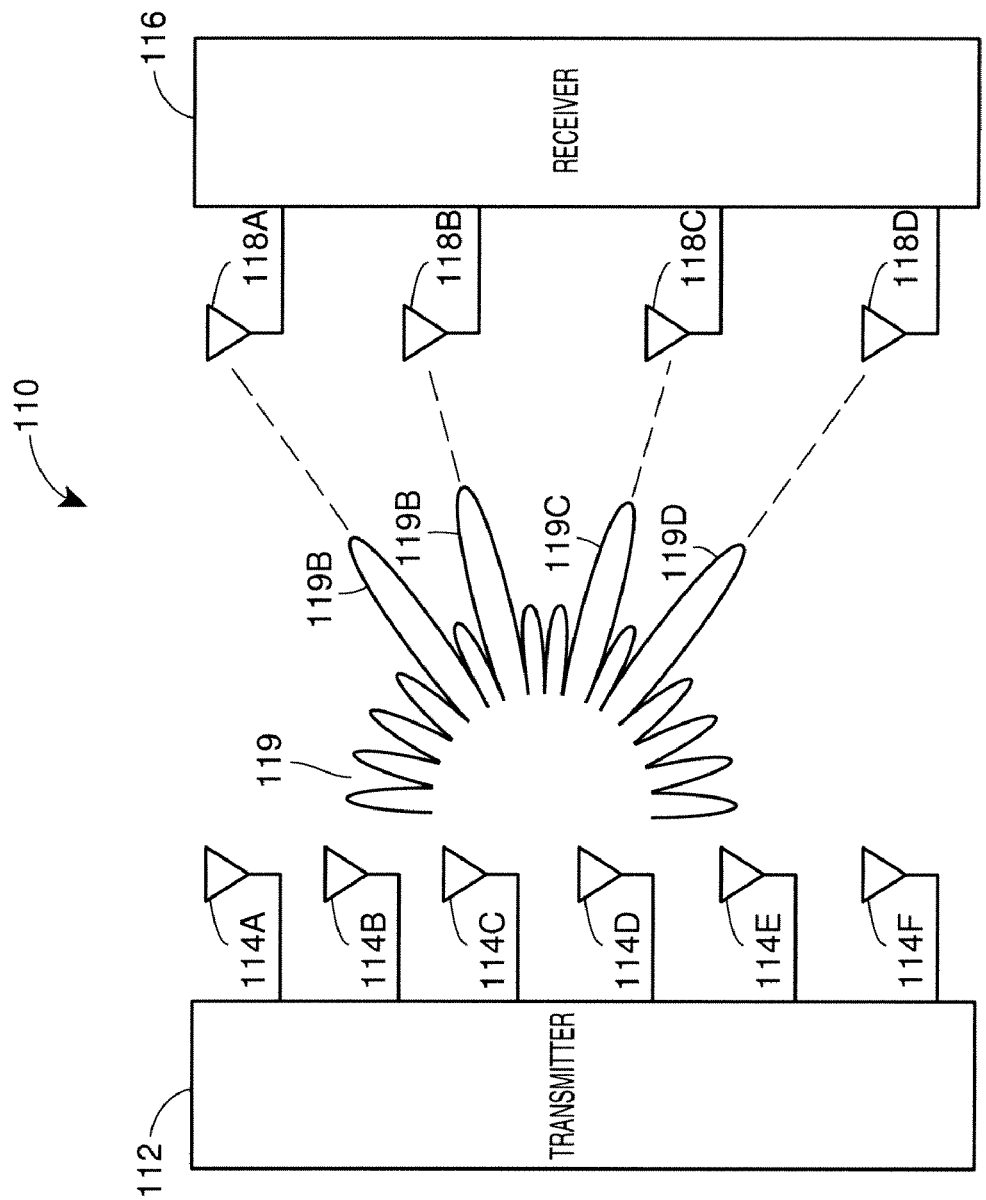
FIG. 2 is a block diagram illustrating a transmit gain pattern for wireless communications between a single transmitter and a single receiver.

To illustrate the beamforming technique described herein, FIG. 2 shows a MIMO communication system 110 having a single transmitter 112 with six transmitter antennas 114A-114F, and a single receiver 116 with four receiver antennas 118A-118D. In this example, the steering matrix is developed by the transmitter 112 using feedback indicative of the CSI and/or intermediate steering matrix information to create a transmit gain pattern 119 as shown disposed next to the transmitter 112. As illustrated in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates a separate high gain lobe directed to each of the receiver antennas 118A-118D, it will be understood that the actual gain pattern produced by the beam steering matrix calculations using information pertaining to the matrix equalizer of the receiver 116 may not necessarily include a separate high gain lobe for each of the receiver antennas 118A-118D. Instead, the gain pattern developed by the beam steering matrix for the transmitter 112 may have a single high gain lobe covering or directed generally to more than one of the receiver antennas 118A-118D. Thus, it is to be understood that the beam pattern resulting from the creation of a steering matrix may or may not have separate high gain lobes separated by low gain regions or nulls for each of the receiver antennas.

Of course, developing the beam pattern 119 to have high gain regions and low gain regions may be performed in any desired manner and location. For example, any of the components within the receiver 16 of FIG. 1, including the controller 40 and the steering matrix calculation unit 48 optionally may process steering information and may then send this information to the transmitter 12. In this case, the controller 20 or the steering matrix calculation unit 28 within the transmitter 12 may use the steering information to determine the steering matrix for use in the precoding block 24 for performing beamforming to the receiver 16. On the other hand, the controller 40 or the steering matrix calculation unit 48 within the receiver 16 may use the steering information to determine the steering matrix for use in the precoding block 24 of the transmitter 12, and may then transmit this steering matrix to the transmitter 12.

The receiver 116 may compute the steering matrix to be used by the transmitter 112 based on the CSI developed by the receiver 116, and may send the actual steering matrix to the transmitter 112 to be used in transmitting information to the receiver 16. On the other hand, the steering matrix for the transmitter precoding block 24 of FIG. 1 may be calculated by the steering matrix calculation unit 28 within the transmitter 12 based on the steering information generated by the receiver 16 and/or the CSI provided and sent back from the receiver 16 to the transmitter 12. With implicit beamforming, the steering matrix for the transmitter precoding block 24 of FIG. 1 may be calculated by the steering matrix calculation unit 28 within the transmitter 12 based on CSI for the reverse channel.

Figure 3:
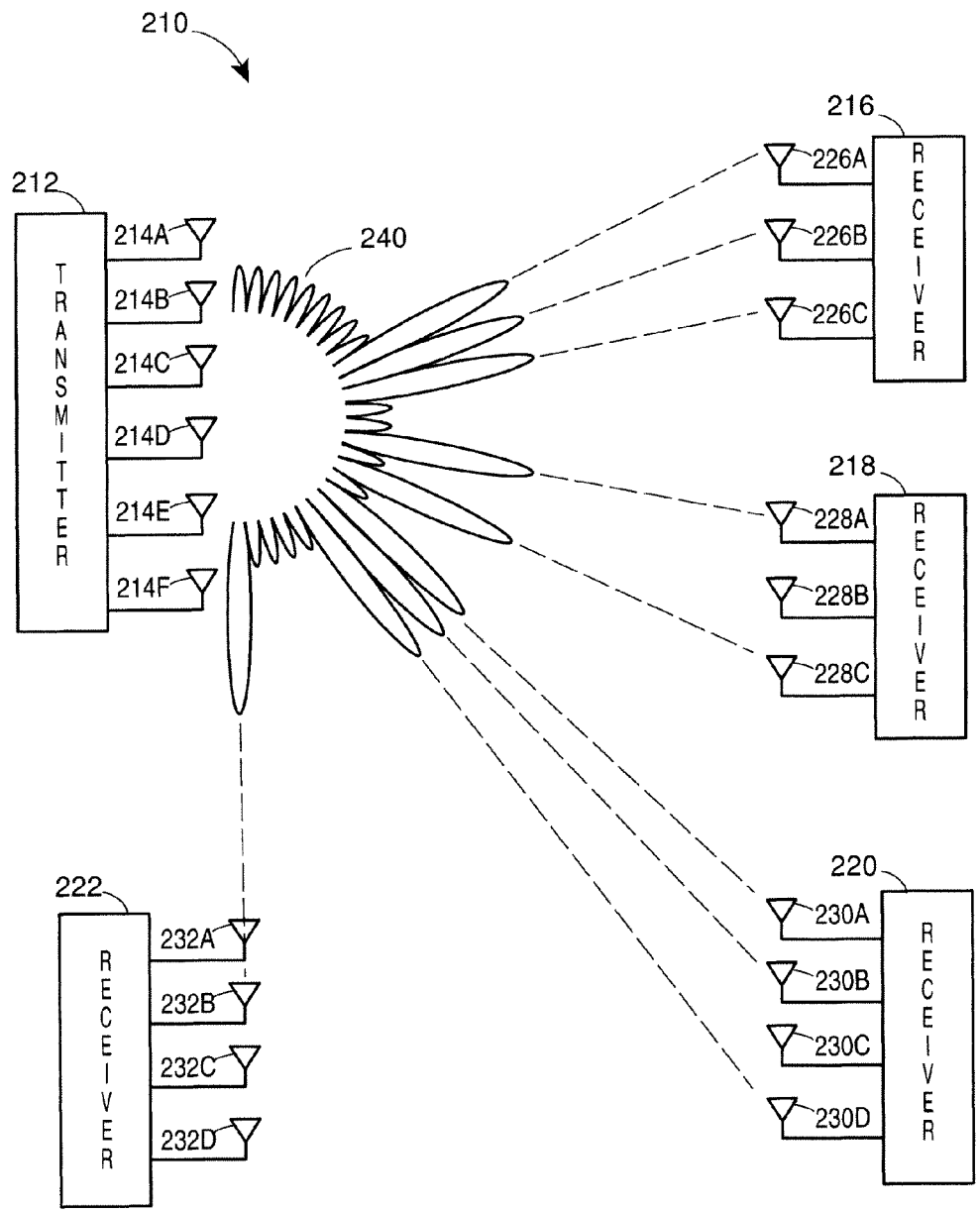
FIG. 3 is a block diagram illustrating a transmit gain pattern for wireless communications between a single transmitter and multiple receivers.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 3 illustrates a MIMO system 210 in which a single transmitter 212 having multiple (in this example six) transmitter antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antenna, any or all of the receivers 216, 218, 220, 222 of FIG. 3 could include different numbers of receiver antennas, including only a single receiver antenna if so desired. In any event, as illustrated by the transmit gain pattern 240 illustrated in FIG. 3, the steering matrix calculated and used by the transmitter 212 is formed using steering information generated by one or more of the transmitter 212 and/or the receivers 216, 218, 220 and 222.

In one example, the transmitter steering matrix may be calculated or determined using steering information generated by each of the receivers 216, 218, 220 and 222, so that, as shown by the transmit gain pattern 240, a high gain lobe is directed to at least one receiver antenna of each of the receivers 216, 218, 220, 222 at the same time. However, the steering matrix need not necessarily produce a high gain lobe directed to all of the receiver antennas of each of the receivers 216, 218, 220, 222, and not necessarily to all of the receiver antennas for any particular one of the receivers 216, 218, 220, 222. Thus, as illustrated in FIG. 3, the steering matrix for the transmitter 212 is determined in such a manner that a separate high gain lobe is directed to each of the receiver antennas 226A, 226B, 226C, 228A, 228C, 230A, 230B and 230D. However, due to the physical location of the receiver 222 and its antennas with respect to the transmitter 212, a single high gain lobe is directed to the receiver antennas 232A-232D, resulting in a single high gain lobe in the transmit gain pattern 240 directed to all of these receiver antennas On the other hand, the transmitter 212 may develop a different steering matrix for each of the receivers 216, 218, 220 and 222 using steering information generated by each of these receivers, and may use those steering matrixes to beamform to the separate or different receivers at different times or using different channels, e.g., OFDM channels, of the system.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without utilizing steering information generated by that receiver. As another example, a particular receiver may be disposed in a low gain region associated with the transmitter, but may be disposed relatively close to the transmitter so that the particular receiver adequately receives the signals transmitted by the transmitter without utilizing steering information generated by that receiver. Of course, if desired, the number and location (identity) of the receivers used in calculating the transmitter steering matrix can be determined in any manner, including by trial and error, in determining an acceptable or optimal steering matrix using steering information generated by more than one receiver. Still further, while the maximum gains of the high gain lobes of each of the transmit gain patterns shown in FIGS. 2 and 3 are shown as being the same, the steering matrix calculation units 28 and 48 may develop steering matrixes which produce high gain lobes with differing maximum gains.

If implicit beamforming is utilized, the transmitter 212 may develop steering matrices based on CSI associated with the multiple reverse channels between the transmitter 212 and the multiple receivers 216, 218, 220 and 222.

In some embodiments, a steering matrix may be generated based on entries in a codebook. For example, if the codebook is a matrix, the steering matrix may be generated based on selecting a subset of one or more columns in the codebook matrix. Optionally, selection of columns in a codebook matrix optionally may be implemented, at least partially, by using computational resources of the matrix equalizer 25 of the transmitter 16 or the matrix equalizer 35 of the receiver 14 (FIG. 1). Then, a steering matrix may be generated based on using direct processing of the selected codebook columns, such as using SVD.

Figure 4:
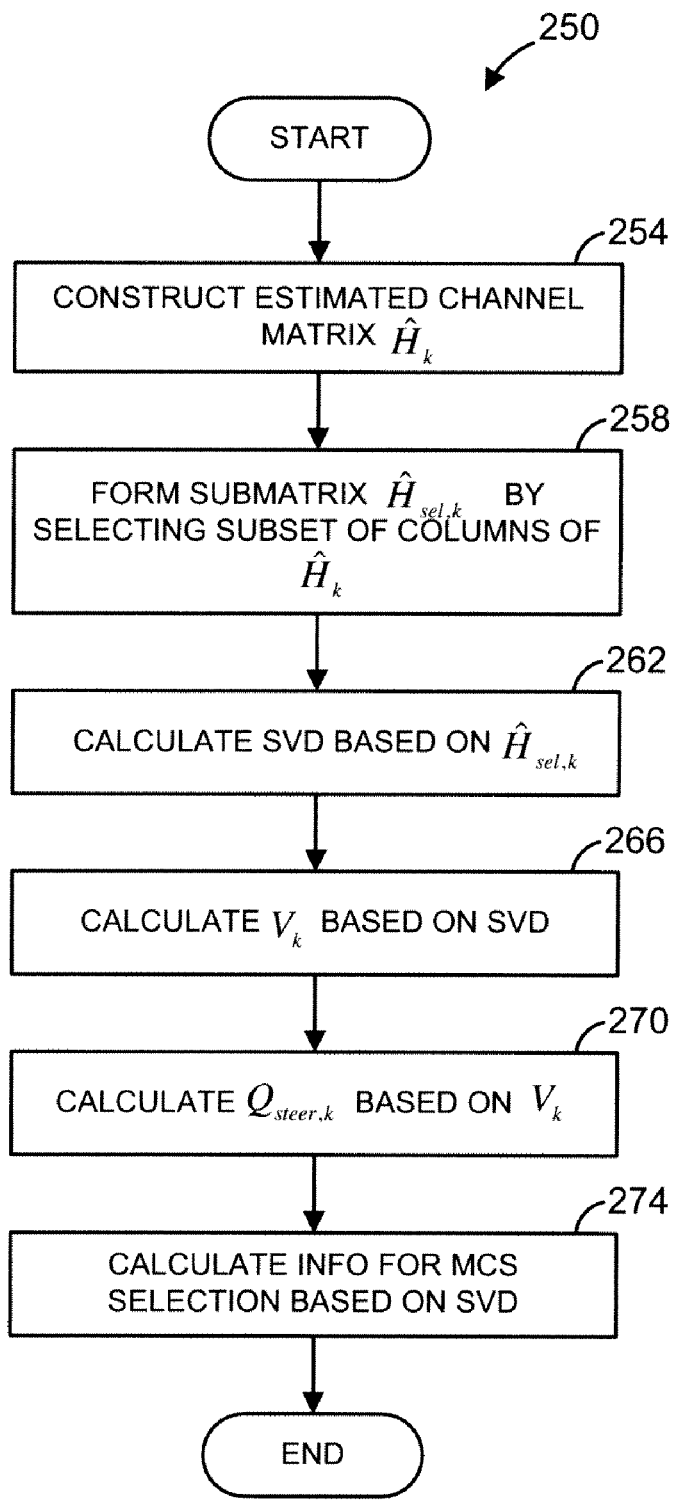
FIG. 4 is a flow diagram of an example steering matrix calculation method.

FIG. 4 is a block diagram of an example method 250 for generating a steering matrix. The method 250 may be used in a MIMO-OFDM system, where the method 250 may be applied in each subcarrier, or in other suitable systems. A transmitted data packet on a channel subcarrier k may be characterized by the equation $y_k = H_k Q_{steer,k} s_k + n_k$, where $y_k$ is the received vector, $H_k$ is the channel state information of a channel subcarrier, $Q_{steer,k}$ is a spatial steering matrix, $s_k$ is a transmitted vector, and $n_k$ is an additive noise vector. The method 250 may be utilized to generate the steering matrix $Q_{steer,k}$, which may be used to steer subsequently transmitted data packets. The method 250 may be beneficial when the number of data streams $N_{SS}$ is less than the number of transmit antennas $N_{TX}$, for example. The method 250 will be described with reference to FIG. 1. It is to be understood, however, that the method 250 need not be implemented by the system 10, but may be implemented by other systems or devices as well.

The method 250 utilizes codebook selection. A codebook $\Omega_i$ may, for purposes of codebook selection, be denoted as a codebook matrix [$\Omega_i$], which may be a unitary matrix of size $N_{TX} \times N_{TX}$. Each element of the codebook matrix [$\Omega_i$] optionally may contain the same power, which may help reduce power fluctuation over different transmit RF chains and antennas during data packet transmission. As will be described in more detail below, a sub-matrix (e.g., a subset of column vectors) may be selected for each of one or more codebook matrices [$\Omega_i$]. A final steering matrix $Q_{steer,k}$ may be the generated based on a sub-matrix selected among all different codebooks (if there is more than one codebook). When there is one codebook, the sub-matrix selection is straightforward.

At a block 254, an estimated channel matrix $\hat{H}_k$ may be constructed by using channel sounding. Channel information from the channel sounding may be used at the block 254 to construct the estimated channel matrix $\hat{H}_k$. Transmit beamforming may be explicit or implicit. When explicit beamforming is used, the estimated channel matrix $\hat{H}_k$ is an estimate of the multiplication of the true channel state information $\hat{H}_k$ from the transmitter to the receiver of a channel subcarrier k, and the predetermined sounding spatial mapping matrix $Q_{sounding,k}$. The sounding spatial mapping matrix $Q_{sounding,k}$ may be set to one of the codebook matrices [$\Omega_i$] for all subcarriers k, without loss of generality. The estimated channel matrix $\hat{H}_k$ for a channel subcarrier k may be expressed by the equation $\hat{H}_k = (H_k [\Omega_i])_{est}$.

The receiver may directly get information on the actual channel matrix multiplied with the codebook matrix so that the transmitter or receiver (depending on the type of explicit beamforming used) will perform the codebook selection without a need to re-multiply the matrices. Specifically, if the receiver performs the codebook selection, e.g., during explicit beamforming with steering matrix feedback, the receiver does not need to know what codebook matrix $[\Omega_i]$ is applied at the transmitter. Similarly, if the transmitter performs the codebook selection, e.g., during explicit beamforming with channel state information matrix feedback, the receiver will directly feed back the matrix $\hat{H}_k$, and the transmitter can perform the selection directly. The channel sounding spatial mapping matrix $Q_{sounding,k}$ is a matrix of size $N_{TX} \times N_{TX}$, and may be a unitary matrix with identical row norms, or may be another size or type of matrix. The device which sends the steered packets may be referred to as a beamformer and a recipient device may be referred to as a beamformee. In the system 10, the controller 20, for example, may cause a sounding packet to be transmitted to the receiver 16. After the receiver 16 receives the sounding packet, any of various blocks in the receiver 16 may determine the matrix $\hat{H}_k$ such as the controller 40, the matrix equalizer 35 or the steering matrix calculation unit 48. Then, if channel state information matrix feedback is utilized, the controller 40, for example, may cause the matrix $\hat{H}_k$ to be transmitted back to the transmitter 12.

On the other hand, when implicit beamforming is used, a sounding packet is sent from the beamformee to the beamformer to get the channel estimation of the reverse link, e.g., the MIMO channel from beamformee to beamformer. The beamformer then transposes the estimated reverse link channel matrix to form an estimated forward link channel matrix. The forward link may be, for example, the MIMO channel from beamformer to beamformee. The beamformer may directly calculate the steering matrix $Q_{steer,k}$ based on the estimated forward link channel matrix. Compared to explicit beamforming, implicit beamforming may reduce the amount of feedback and overhead. The estimated channel matrix $\hat{H}_k$ may be constructed based on the received sounding packet in either case, and is described in more detailed below.

If there is one codebook, the estimated channel matrix $\hat{H}_{k\_CB1}$ for the codebook is equivalent to the estimated channel matrix $\hat{H}_k$, because the codebook selection will default to the one codebook. If there is a plurality of codebooks and if $Q_{sounding,k}=[\Omega_1]$ (without loss of generality), then the estimated channel matrix $\hat{H}_{k\_CBn}$ for each codebook may be computed as $\hat{H}_k[\Omega_{n-1}]^H[\Omega_n] \approx (H_k[\Omega_n])_{est}$, where $[\Omega_{n-1}]^H$ is the conjugate transpose of the codebook $[\Omega_1][\Omega_1]^H$. The codebook $[\Omega_1][\Omega_1]^H$ is equal to an identity matrix because the codebook matrices are unitary. In the case of implicit beamforming, $Q_{sounding,k}=[\Omega_1]$ does not hold and instead $Q_{sounding,k}=I$, e.g., an identity matrix, because the beamformer does not apply any spatial mapping at the receiver upon receiving the sounding packet. Therefore, the estimated channel matrix $\hat{H}_k$ is an estimation of true channel matrix $H_k$, and regardless of the number of codebooks, $\hat{H}_{k\_CBn}=\hat{H}_k[\Omega_n]$. In the system 10, the controller 40, for example, may cause a sounding packet to be transmitted to the transmitter 12. After the transmitter 12 receives the sounding packet, any of various blocks in the transmitter 12 may determine the matrix $\hat{H}_k$ such as the controller 20, the matrix equalizer 25 or the steering matrix calculation unit 28. In the case of implicit beamforming and explicit beamforming with channel state information feedback, the remaining blocks of the method 250 may be performed at the beamformer, e.g., the transmitter. For explicit beamforming with steering matrix feedback, the remaining blocks of the method 250 may be performed at the beamformee, e.g., the receiver. In other explicit beamforming scenarios, some of the remaining blocks of the method 250 may be performed at the beamformee, intermediate information transmitted from the beamformee to the beamformer, and the other remaining blocks of the method 250 may be performed at the beamformer using the intermediate information.

At a block 258, a sub-matrix $\hat{H}_{sel,k}$ may be formed from the estimated channel matrix $\hat{H}_k$. A number $N_{SS}$ columns may be selected from the estimated channel matrix $\hat{H}_k$ to form the sub-matrix $\hat{H}_{sel,k}$, where $N_{SS}$ is the number of data streams, and where $N_{SS}$ is less than $N_{TX}$. If there is a plurality of codebooks, then the number $N_{SS}$ columns may be selected from the estimated channel matrix $\hat{H}_k$ for each of the codebooks. The selection of the $N_{SS}$ columns may be based on one or a combination of known antenna selection algorithms. These algorithms may include a Shannon Capacity maximization algorithm, a maximum of weakest post processing signal-to-noise ratio algorithm, an incremental selection algorithm, a decremental selection algorithm, a correlation of estimated channel matrix columns algorithm, and other suitable algorithms. For example, the incremental selection algorithm may be used, which first selects the column in the estimated channel matrix $\hat{H}_k$ with the largest norm. In further iterations of the incremental selection algorithm, the projection of each of the remaining columns to the null space of the space spanned by the previous selected columns is calculated. Iteration of the incremental selection algorithm may continue until the $N_{SS}$-th column is selected.

Forming the sub-matrix $\hat{H}_{sel,k}$ may include forming a selection matrix $V_{0,k}$ based on the sub-matrix $\hat{H}_{sel,k}$. The selection matrix $V_{0,k}$ may be composed of $N_{SS}$ columns of a $N_{TX} \times N_{TX}$ identity matrix. In particular, if the i-th column of the estimated channel matrix $\hat{H}_k$ is selected to be the j-th column in the sub-matrix $\hat{H}_{sel,k}$ for a given codebook, then the element in the i-th row and j-th column of the selection matrix $V_{0,k}$ may be set to be 1. If there is a plurality of codebooks, then the selection matrix $V_{0,k}$ for each codebook may be formed as a permutation of $N_{SS}$ columns in an identity matrix. In the case of one codebook, the selection matrix is equal to $V_{0,k}$, which is composed of 0s and 1s. In the case of multiple codebooks, the selection matrix $V_{0,k}$ for each codebook in a plurality of codebooks may be expressed as $V_{0,k}=[\Omega_{n-1}]^H[\Omega_n]\tilde{V}_{0,k}$, where $\tilde{V}_{0,k}$ is the selection matrix composed of 0s and 1s. The selection matrix may be calculated at the transmitter or the receiver, depending on what type of beamforming is used, and is described in more detail below. Referring to FIG. 1, forming the sub-matrix $\hat{H}_{sel,k}$ may be performed by the controller 20 or the steering matrix calculation unit 28, for example. Optionally, as described in MP1831, computational resources of the matrix equalizer 25 may be utilized, such as for implementing the incremental selection algorithm described above. Similarly, forming the sub-matrix $\hat{H}_{sel,k}$ may be performed by one or more of the controller 40, the steering matrix calculation unit 48, and the matrix equalizer 35, for example.

If there are multiple codebooks, an estimated channel matrix $\hat{H}_k$ may be constructed for each codebook, as described above (e.g., $\hat{H}_k[\Omega_1]^H[\Omega_n] \approx (H_k[\Omega_n])_{est}$). Additionally, a sub-matrix $\hat{H}_{sel,k}$ and a selection matrix $V_{0,k}$ may be formed for each codebook, as described above. Further, an optimal codebook may be selected based on a certain criterion C. For example, the optimal codebook may be selected by the largest Shannon channel capacity of $\hat{H}_{sel,k}$ for each codebook. If there is one codebook, the optimal codebook is set to the one codebook, by default. If there is a plurality of codebooks, the selected optimal codebook may be denoted as the codebook $n_0$, where $$n_0 = \arg\max_{l=1...N_{CB}} C(\hat{H}_{sel,k\_CBl}).$$

The final selection matrix $V_{0,k}$ is then determined by the selection matrix corresponding to the $n_0$-th codebook.

At a block 262, a singular value decomposition (SVD) may be calculated based on $\hat{H}_{sel,k}$. For example, as described above, one technique for selecting columns of $\hat{H}_k$ is an incremental selection algorithm in which the column in the estimated channel matrix $\hat{H}_k$ with the largest norm is first selected, and, in further iterations, a next column is selected based on the projection of each of the remaining columns to the null space of the space spanned by the previous selected columns. An example of this type of algorithm and hardware for implementing the algorithm are described in MP1831. In particular, the result of the selection algorithm described in MP1831 is a QR decomposition of the matrix $\hat{H}_{sel,k}$. If this algorithm is utilized, an SVD of the matrix R may be calculated. If another technique for selecting columns of $\hat{H}_k$ is utilized, a QR decomposition may be performed on $\hat{H}_{sel,k}$, and an SVD of the R may be calculated. As yet another example, a correlation matrix B may be calculated as:

$$B_k = \hat{H}_{k,sel}{}^H \hat{H}_{k,sel} \qquad \text{(Equation 1)}$$

Then, the SVD of B may be calculated. In any case, a matrix $V_{SVD,k}$ may be generated at the block 262. Referring to FIG. 1, generating the matrix $V_{SVD,k}$ may be performed by the controller 20 or the steering matrix calculation unit 28, for example. Optionally, computational resources of the matrix equalizer 25 may be utilized. Similarly, generating the matrix $V_{SVD,k}$ may be performed by one or more of the controller 40, the steering matrix calculation unit 48, and the matrix equalizer 35, for example.

At a block 266, a selection matrix $V_k$ is calculated based on the SVD calculated at the block 262. For example, the selection matrix $V_k$ may be calculated based on the SVD and based on the matrix selection matrix $V_{0,k}$. For instance, the $V_{SVD,k}$ matrix resulting from the SVD may be multiplied with $V_{0,k}$:

$$V_k = V_{0,k} V_{SVD,k} \qquad \text{(Equation 2)}$$

Then, at a block 270, the steering matrix may be generated as:

$$Q_{steer,k} = Q_{sounding,k} V_k \qquad \text{(Equation 3)}$$

Referring to FIG. 1, calculating the selection matrix $V_k$ and generating the steering matrix may be performed by the controller 20 or the steering matrix calculation unit 28, for example. Similarly, calculating the selection matrix $V_k$ and generating the steering matrix may be performed by one or both of the controller 40 and the steering matrix calculation unit 48.

At a block 274, information for modulation code set (MCS) selection optionally may be generated based on the SVD. For example, singular values generated from the SVD may be generated, and these singular values may be utilized for calculating post-processing signal-to-noise ratios (SNRs) for different numbers of streams. Referring to FIG. 1, generating information for MCS selection may be performed by the controller 20 or the steering matrix calculation unit 28, for example. Similarly, generating information for MCS selection may be performed by one or both of the controller 40 and the steering matrix calculation unit 48.

Examples implementations of the method 250 will now be described in the context of two scenarios: 1) three transmit antennas ($N_{TX}=3$) and two data streams ($N_{SS}=2$); and 2) four transmit antennas ($N_{TX}=4$) and three data streams ($N_{SS}=3$). It is to be understood, however, that these are merely example implementations for these scenarios, and that other implementations may be utilized. Moreover, it is to be understood that the method 250 may be utilized in scenarios other than the two set forth herein. In general, however, the number of transmit antennas $N_{TX}$ should be greater than the number of streams $N_{SS}$.

Three Transmit Antennas ($N_{TX}$ and Two Data Streams ($N_{SS}=2$)

Figure 5:
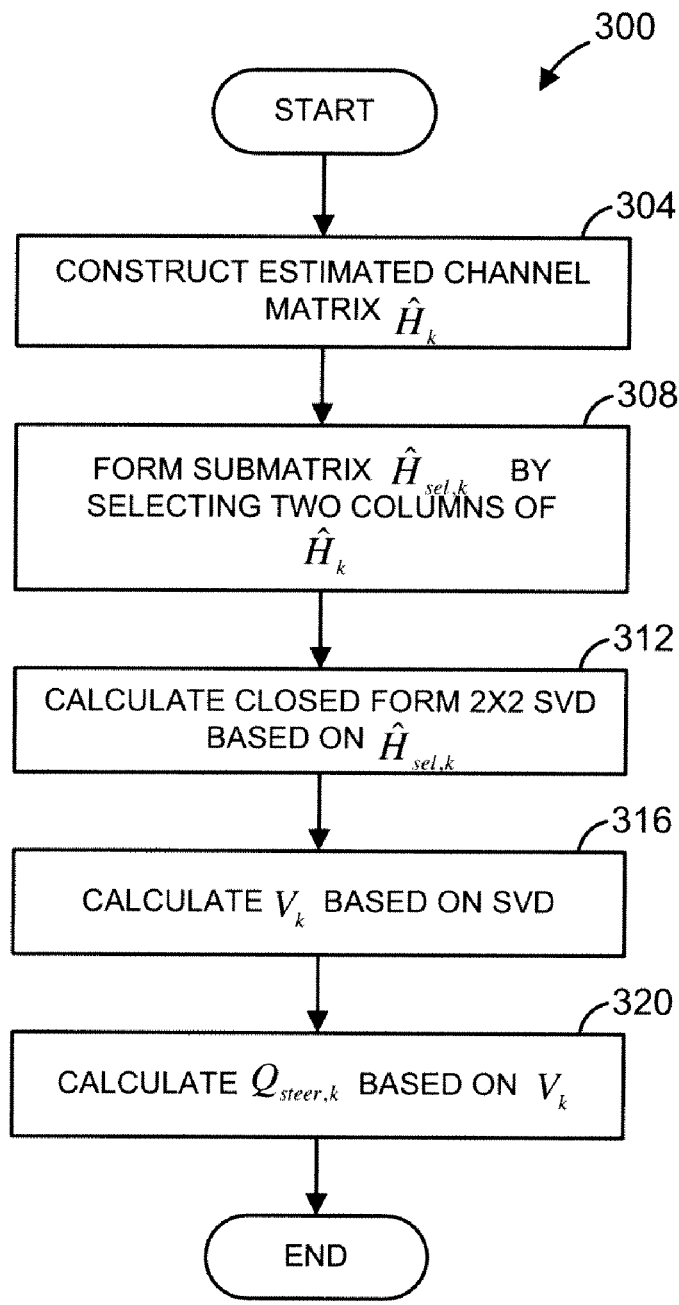
FIG. 5 is a flow diagram of an example implementation of the steering matrix calculation method of FIG. 4 in the context of a system with three transmit antennas and two signal streams.

FIG. 5 is a flow diagram of an example method 300 for generating a steering matrix, and the method 300 is one example implementation of the method 250 of FIG. 4. Thus, as discussed above with respect to FIG. 4, various blocks of FIG. 5 may be implemented by the beamformer or the beamformee based on whether implicit beamforming or explicit beamforming is utilized, and optionally based on other implementation preferences.

At a block 304, an estimated channel matrix $\hat{H}_k$ with dimensions $N_{RX} \times 3$ may be constructed by using channel sounding, where $N_{RX}$ is the number of receive antennas. At a block 308, a sub-matrix $\hat{H}_{sel,k}$ may be formed from the estimated channel matrix $\hat{H}_k$ by selecting two columns of $\hat{H}_k$. The blocks 304 and 308 may be implemented in a manner described above with respect to the blocks 254 and 258 of FIG. 4.

At a block 312, a closed form 2×2 SVD may be calculated based on $\hat{H}_{sel,k}$. If an incremental selection algorithm such as described in MP1831 is utilized for forming $\hat{H}_{sel,k}$, a QR decomposition of the matrix $\hat{H}_{sel,k}$ is generated, and the upper triangular matrix R matrix is a 2×2 matrix:

$$R = \begin{bmatrix} r_{11} & r_{12} \\ 0 & r_{22} \end{bmatrix} \qquad \text{(Equation 4)}$$

where $r_{11}$ and $r_{12}$ are real values and $r_{12}$ is generally complex valued. The closed form SVD of R may be calculated in a variety of ways. For example, a rotation matrix $V_{1,k}$ may be determined that causes the value $r_{12}$ to rotate to a real value:

$$\begin{bmatrix} e^{-j\varphi_{12}} & 0 \\ 0 & 1 \end{bmatrix} \begin{bmatrix} r_{11} & r_{12} \\ 0 & r_{22} \end{bmatrix} \begin{bmatrix} e^{j\varphi_{12}} & 0 \\ 0 & 1 \end{bmatrix} = \begin{bmatrix} r_{11} & |r_{12}| \\ 0 & r_{22} \end{bmatrix} \qquad \text{(Equation 5)}$$

where:

$$V_{1,k} = \begin{bmatrix} e^{j\varphi_{12}} & 0 \\ 0 & 1 \end{bmatrix} \qquad \text{(Equation 6)}$$

Then, a matrix $V_{2,k}$ may be determined that causes the second column of $$\begin{bmatrix} r_{11} & |r_{12}| \\ 0 & r_{22} \end{bmatrix}$$

to rotate so that the first element in the second column goes to zero:

$$V_{2,k} = \begin{bmatrix} \cos\vartheta_V & \sin\vartheta_V \\ -\sin\vartheta_V & \cos\vartheta_V \end{bmatrix} \quad \text{(Equation 7)}$$

where:

$$\vartheta_V = \frac{\vartheta_{sum} + \vartheta_{diff}}{2} \quad \text{(Equation 8)}$$

$$\vartheta_{sum} = \tan^{-1}\left(\frac{|r_{12}|}{r_{22} - r_{11}}\right) \quad \text{(Equation 9)}$$

$$\vartheta_{diff} = \tan^{-1}\left(\frac{-|r_{12}|}{r_{22} + r_{11}}\right) \quad \text{(Equation 10)}$$

Thus, the matrix $V_{SVD,k}$ may be determined as:

$$V_{SVD,k} = V_{1,k}V_{2,k} = \begin{bmatrix} e^{j\varphi_{12}}\cos\vartheta_V & e^{j\varphi_{12}}\sin\vartheta_V \\ -\sin\vartheta_V & \cos\vartheta_V \end{bmatrix} \quad \text{(Equation 11)}$$

Next, singular values associated with the SVD of the R matrix may be calculated. For example, the singular values may be calculated as:

$$\begin{bmatrix} \sigma_1 & 0 \\ 0 & \sigma_2 \end{bmatrix} = \begin{bmatrix} \cos\vartheta_U & -\sin\vartheta_U \\ \sin\vartheta_U & \cos\vartheta_U \end{bmatrix} \quad \text{(Equation 12)}$$

$$\begin{bmatrix} r_{11} & |r_{12}| \\ 0 & r_{22} \end{bmatrix} \begin{bmatrix} \cos\vartheta_V & \sin\vartheta_V \\ -\sin\vartheta_V & \cos\vartheta_V \end{bmatrix}$$

where $$\vartheta_V = \frac{\vartheta_{sum} - \vartheta_{diff}}{2} \quad \text{(Equation 13)}$$

If $\sigma_1 < \sigma_2$, the columns of $V_{SVD,k}$ may be switched. Alternatively, the columns of $V_k$, which is generated from $V_{SVD,k}$ as will be described below, may be switched if $\sigma_1 < \sigma_2$. The singular values may be utilized, as described above, for MCS selection.

In another implementation of the block 312, the correlation matrix $B_k$ may be calculated:

$$B_k = \hat{H}_{k,sel}^H \hat{H}_{k,sel} = \begin{bmatrix} B_{11} & B_{12} \\ B_{12}^* & B_{22} \end{bmatrix} \quad \text{(Equation 14)}$$

where B has real positive diagonal values. The closed form SVD of $B_k$ may be calculated in a variety of ways. For example, a rotation matrix $V_{1,k}$ may be determined that causes the values $B_{12}$ and $B_{12}^*$ to rotate to real values:

$$\begin{bmatrix} 1 & 0 \\ 0 & e^{j\varphi} \end{bmatrix} \begin{bmatrix} B_{11} & B_{12} \\ B_{12}^* & B_{22} \end{bmatrix} \begin{bmatrix} 1 & 0 \\ 0 & e^{-j\varphi} \end{bmatrix} = \begin{bmatrix} B_{11} & |B_{12}| \\ |B_{12}| & B_{22} \end{bmatrix} \quad \text{(Equation 15)}$$

where:

$$V_{1,k} = \begin{bmatrix} 1 & 0 \\ 0 & e^{-j\varphi} \end{bmatrix} \quad \text{(Equation 16)}$$

Then, a matrix $V_{2,k}$ may be determined that causes the columns of $$\begin{bmatrix} B_{11} & |B_{12}| \\ |B_{12}| & B_{22} \end{bmatrix}$$

to rotate so that the non-diagonal elements go to zero:

$$V_{2,k} = \begin{bmatrix} \cos\vartheta_V & \sin\vartheta_V \\ -\sin\vartheta_V & \cos\vartheta_V \end{bmatrix} \quad \text{(Equation 17)}$$

where:

$$\vartheta_V = \frac{\vartheta_{sum}}{2} \quad \text{(Equation 18)}$$

$$\vartheta_{sum} = \tan^{-1}\left(\frac{2|B_{12}|}{B_{22} - B_{11}}\right) \quad \text{(Equation 19)}$$

Thus, the matrix $V_{SVD,k}$ may be determined as:

$$V_{SVD,k} = V_{1,k}V_{2,k} = \begin{bmatrix} \cos\vartheta_V & \sin\vartheta_V \\ -e^{j\varphi}\sin\vartheta_V & e^{-j\varphi}\cos\vartheta_V \end{bmatrix} \quad \text{(Equation 20)}$$

Next, singular values associated with the SVD of the B matrix may be calculated. For example, the singular values may be calculated as:

$$\begin{bmatrix} \sigma_1 & 0 \\ 0 & \sigma_2 \end{bmatrix} = \begin{bmatrix} \cos\vartheta_V & -\sin\vartheta_V \\ \sin\vartheta_V & \cos\vartheta_V \end{bmatrix} \quad \text{(Equation 21)}$$

$$\begin{bmatrix} B_{11} & |B_{12}| \\ |B_{12}| & B_{22} \end{bmatrix} \begin{bmatrix} \cos\vartheta_V & \sin\vartheta_V \\ -\sin\vartheta_V & \cos\vartheta_V \end{bmatrix}$$

If $\sigma_1 < \sigma_2$, the columns of $V_{SVD,k}$ may be switched. Alternatively, the columns of $V_k$, ($V_k$ being generated from $V_{SVD,k}$, as will be described below) may be switched if $\sigma_1 < \sigma_2$. The singular values may be utilized, as described above, for MCS selection.

At a block 316, the selection matrix $V_k$ may be calculated based on the SVD calculated at the block 312. For example, the selection matrix may be calculated as:

$$V_k = V_{0,k}V_{SVD,k} = V_{0,k}V_{1,k}V_{2,k} \quad \text{(Equation 22)}$$

Then, at a block 320, the steering matrix may be generated based on $V_k$. For example, the steering matrix may be calculated according to Equation 3.

If explicit beamforming with steering matrix feedback is used, the selection matrix $V_k$ may be fed back from the receiver (beamformee) to the transmitter (beamformer). If there is only one codebook applied in the codebook selection process, $V_k$ is only composed of 0 and 1 elements, as described above. The feedback overhead may therefore be greatly reduced in this case. For example, the selection matrix $V_k$ may be fed back in the form of a matrix with a small number of bits representing each of its 0 and 1 elements. In another example, the selection matrix $V_k$ may be fed back as the indices of the selected columns, e.g., if the first and third columns are selected in the estimated channel matrix $\hat{H}_k$, indices "1" and "3" may be fed back, and the transmitter may reconstruct the selection matrix $V_k$ using these indices.

Four Transmit Antennas ($N_{TX}$=4) and Three Data Streams ($N_{SS}$=3)

Figure 6:
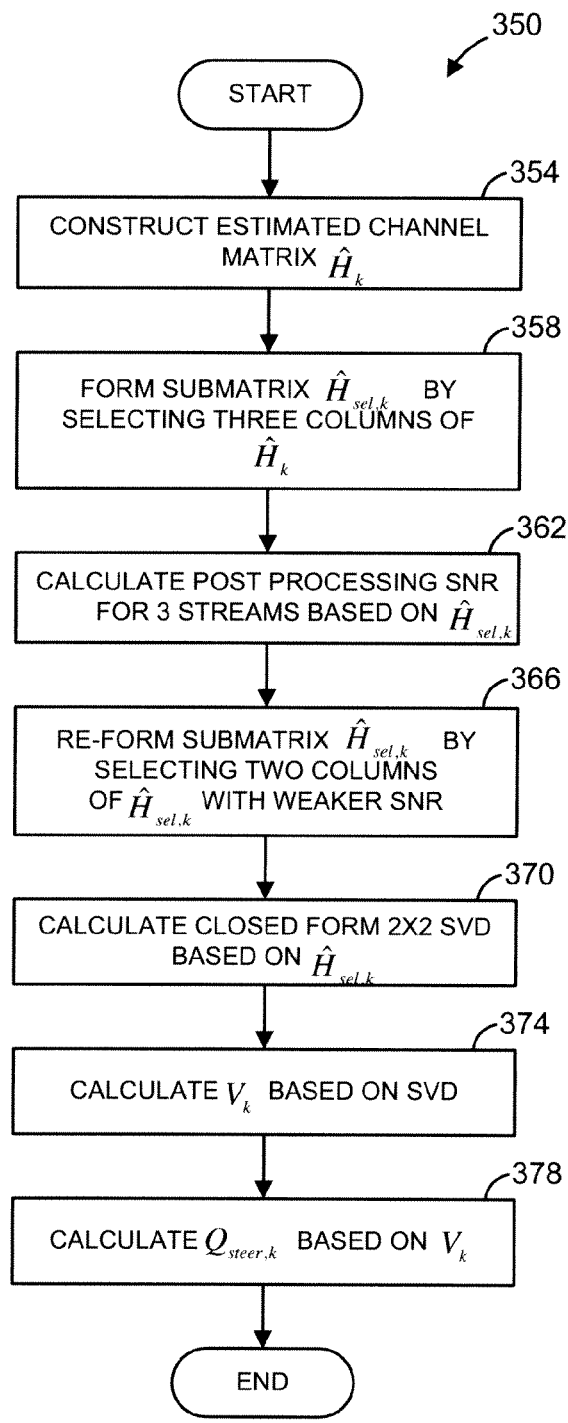
FIG. 6 is a flow diagram of an example implementation of the steering matrix calculation method of FIG. 4 in the context of a system with four transmit antennas and three signal streams.

FIG. 6 is a flow diagram of an example method 350 for generating a steering matrix, and the method 350 is one example implementation of the method 250 of FIG. 4. Thus, as discussed above with respect to FIG. 4, various blocks of FIG. 6 may be implemented by the beamformer or the beamformee based on whether implicit beamforming or explicit beamforming is utilized, and optionally based on other implementation preferences.

At a block 354, an estimated channel matrix $\hat{H}_k$ with dimensions $N_{RX}$×4 may be constructed by using channel sounding. At a block 358, a sub-matrix $\hat{H}_{sel,k}$ may be formed from the estimated channel matrix $\hat{H}_k$ by selecting three columns of $\hat{H}_k$. The blocks 354 and 358 may be implemented in a manner described above with respect to the blocks 254 and 258 of FIG. 4.

At a block 362, post MIMO equalizer (post-MEQ) SNR values for the three streams corresponding to the columns selected at the block 358 may be calculated. For example, generating the post-MEQ SNR value corresponding to each selected column may include projecting the column to the null space spanned by the remaining columns in $\hat{H}_{sel,k}$, and the projection may be proportional to the weakest post-MEQ SNR value, assuming zero-forcing MEQ. Post-MEQ SNR values for the three streams may be calculated in other ways as well.

At a block 366, the sub-matrix $\hat{H}_{sel,k}$ may be re-formed by selecting two of the columns of $\hat{H}_{sel,k}$ with the weakest post-MEQ SNR values calculated at the block 366. Thus, after the block 366, the sub-matrix $\hat{H}_{sel,k}$ will include only two columns.

At a block 370, a closed form 2×2 SVD may be calculated based on $\hat{H}_{sel,k}$. If an incremental selection algorithm such as described in MP1831 is utilized for implementing the block 358, a QR decomposition of the matrix $\hat{H}_{sel,k}$ prior to re-forming at the block 366 is generated. In this implementation, the R matrix generated at the block 358 includes the values $r_{11}$, $r_{12}$, and $r_{22}$, and these values can be considered as forming an upper triangular 2×2 R matrix:

$$R = \begin{bmatrix} r_{11} & r_{12} \\ 0 & r_{22} \end{bmatrix}$$ (Equation 23)

where $r_{11}$ and $r_{12}$ are real values and $r_{12}$ is generally complex valued. If the two columns selected at the block 366 correspond to the first two columns of the matrix $\hat{H}_{sel,k}$ prior to re-forming, the matrix R (Equation 23) generated at the block 358 may be utilized for subsequent SVD processing. Otherwise, the QR decomposition of the re-formed matrix $\hat{H}_{sel,k}$ may be calculated to generate the matrix R (Equation 23).

The closed form SVD of R may be calculated in a variety of ways. For example, the 2×2 matrix $V_{2,k}$ (Equation 7) may be determined as described previously with reference to FIG. 5. Then, a 3×3 matrix $V_{SVD,k}$ may be calculated according to:

$$V_{SVD,k} = \begin{bmatrix} V_{2,k} & 0 \\ 0 & 1 \end{bmatrix}$$ (Equation 24)

In another implementation of the block 370, the correlation matrix $B_k$ and its closed form SVD may be calculated. The closed form SVD of $B_k$ may be calculated in a variety of ways such using the technique described above with respect to FIG. 5. Then, the matrix $V_{SVD,k}$ may be determined according to Equation 24.

At a block 374, the selection matrix $V_k$ may be calculated based on the SVD calculated at the block 370. For example, the selection matrix may be calculated as:

$$V_k = V_{0,k} V_{SVD,k}$$ (Equation 25)

Then, at a block 378, the steering matrix may be generated based on $V_k$. For example, the steering matrix may be calculated according to Equation 3.

Optionally, SNR values for MCS selection may be calculated based on a QR decomposition of the steered channel. Optionally, the SNR values may be calculated based on a QR decomposition of the matrix $\hat{H}_{sel,k}$ prior to re-forming at the block 366. If QR decomposition is utilized at the block 358 for selecting columns of the matrix $\hat{H}_k$ prior, then the SNR values may be calculated based on the QR result of the block 358 processing.

Figure 7:
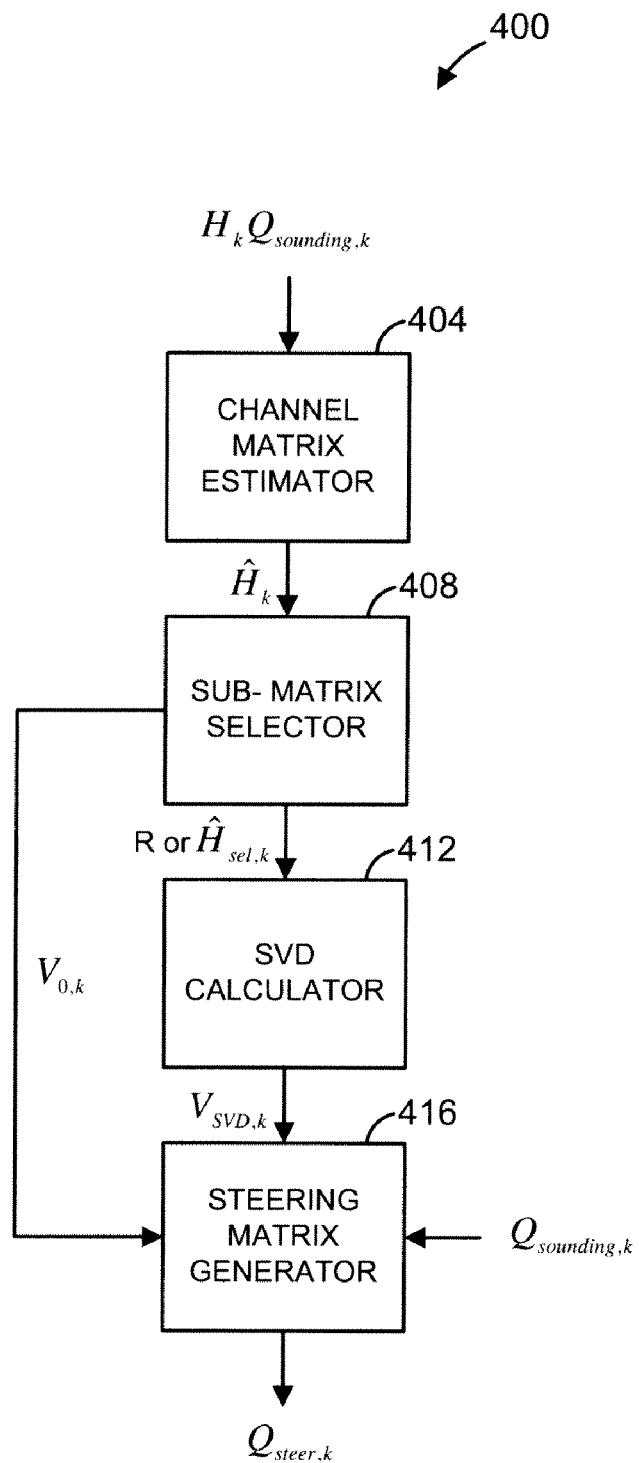
FIG. 7 is a block diagram of an example steering matrix calculator.

FIG. 7 is a block diagram of an example steering matrix calculator 400 for implementing beamforming calculations such as described above. For example, the apparatus 400 may implement one or more of the methods 250, 350 and/or 350. A MIMO channel matrix estimator 404 may generate an estimated channel matrix $\hat{H}_k$ based on, for example, a received sounding packet. If explicit beamforming with channel state information feedback is utilized, the MIMO channel matrix estimator 404 may be omitted, and the estimated channel matrix $\hat{H}_k$ may merely be received from the beamformee. A sub-matrix selector 408 may form a sub-matrix $\hat{H}_{sel,k}$ from the estimated channel matrix $\hat{H}_k$. The sub-matrix selector 408 may generate the selection matrix $V_{0,k}$. Optionally, the sub-matrix selector 408 may include a QR decomposition processor.

A SVD calculator 412 generates an SVD based on the sub-matrix $\hat{H}_{sel,k}$. Optionally, the SVD calculator 412 may include a correlation matrix calculator for calculating the correlation matrix B. The SVD calculator 412 may generate the selection matrix $V_{SVD,k}$. A steering matrix generator 416 may generate the steering matrix based on the selection matrices $V_{0,k}$ and $V_{SVD,k}$, and based on a codebook.

At least some of the codebook selection techniques described above (as part of steering matrix calculation) involve QR decomposition and/or matrix rotations. MP1831 describes examples of QR processors that may be utilized for performing QR decomposition calculations and/or CORDIC rotations. In particular, the QR processors in MP1831 may be utilized in a MIMO equalizer, and the computational resources of the MIMO equalizer may be utilized for beam-steering calculations when, for example, MIMO equalizer calculations do not need to be performed. Of course, other types of QR processors may be utilized, including QR processors not part of a MIMO equalizer computational block.

Moreover, some of the example steering matrix calculations described above do not require QR decomposition.

More generally, each of the various blocks described above with respect to FIGS. 4-7 may be implemented by components of the transmitter 12 and the receiver 16 of FIG. 1. For example, many of the blocks may be implemented by the steering matrix calculation block 28 and/or the steering matrix calculation block 48. Optionally, as previously discussed, each of at least some of the blocks may be fully or partially implemented by the matrix equalizer block 25 and/or the matrix equalizer block 35. Still further, one or more of the blocks described above with respect to FIGS. 4-7 may be implemented by other components of the transmitter 12 and the receiver 16 of FIG. 1.

Moreover, it is to be understood that the example steering matrix calculation methods described with respect to FIGS. 4-7 may be implemented by devices other than the example devices of FIG. 1. More generally, the steering matrix calculation techniques described above may be utilized in various MIMO devices including devices that do not utilize OFDM modulation (e.g., devices that utilize single carrier modulation techniques). For example, steering matrix calculation techniques such as described above may be utilized in base stations, access points, wireless routers, etc. Additionally, steering matrix calculation techniques such as described above may be utilized in devices that incorporate MIMO-based communication modules, such as MIMO-based WLAN modules. Such devices include electronic consumer products that incorporate MIMO-based communication modules, mobile electronic devices that incorporate MIMO-based communication modules, vehicles that incorporate MIMO-based communication modules, etc.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
  selecting, at a transceiver, a sub-matrix from an estimated multiple input, multiple output (MIMO) channel matrix, wherein the estimated MIMO channel matrix is constructed based on a codebook;
  calculating, at the transceiver, a singular value decomposition (SVD) based on the sub-matrix; and
  calculating, at the transceiver, a steering matrix based on the SVD and the codebook.

2. The method of claim 1, wherein the estimated MIMO channel matrix has three columns;
  wherein selecting the sub-matrix comprises selecting two of the three columns of the estimated MIMO channel matrix.

3. The method of claim 1, wherein selecting the sub-matrix comprises generating a QR decomposition of the sub-matrix, wherein the QR decomposition includes an R matrix;
  wherein calculating the SVD based on the sub-matrix comprises calculating an SVD of the R matrix.

4. The method of claim 1, further comprising:
  calculating, at the transceiver, a correlation matrix based on the sub-matrix;
  wherein calculating the SVD based on the sub-matrix comprises calculating an SVD of the correlation matrix.

5. The method of claim 1, wherein the estimated MIMO channel matrix has four columns;
  wherein selecting the sub-matrix comprises selecting two of the four columns of the estimated MIMO channel matrix to form a 2-column sub-matrix.

6. The method of claim 1, wherein the estimated MIMO channel matrix has four columns, and wherein selecting the sub-matrix comprises:
  selecting three columns of the estimated MIMO channel matrix;
  calculating signal to noise ratio (SNR) values associated with the selected three columns of the estimated MIMO channel matrix; and
  selecting two columns of the selected three columns of the estimated MIMO channel matrix based on the SNR values.

7. The method of claim 1, wherein selecting the sub-matrix comprises forming a 2-column sub-matrix.

8. The method of claim 7, further comprising generating a QR decomposition of the 2-column sub-matrix, wherein the QR decomposition includes an R matrix;
  wherein calculating the SVD based on the sub-matrix comprises calculating an SVD of the R matrix.

9. The method of claim 7, further comprising:
  calculating a correlation matrix based on the 2-column sub-matrix;
  wherein calculating the SVD based on the sub-matrix comprises calculating an SVD of the correlation matrix.

10. The method of claim 1, wherein selecting the sub-matrix from the estimated MIMO channel matrix comprises:
  selecting a column in the estimated MIMO channel matrix with the largest norm;

projecting each of the remaining columns in the estimated MIMO channel matrix to the null space spanned by the column in the estimated MIMO channel matrix with the largest norm; and
selecting a next column based on the projections of the remaining columns.

11. The method of claim 1, further comprising:
transmitting, at the transceiver, a training signal; and
receiving, at the transceiver, the estimated MIMO channel matrix.

12. The method of claim 1, further comprising:
receiving, at the transceiver, a training signal; and
constructing, at the transceiver, the estimated MIMO channel matrix based on the training signal and the codebook.

13. An apparatus, comprising:
a sub-matrix selector to select a sub-matrix from an estimated multiple input, multiple output (MIMO) channel matrix, wherein the estimated MIMO channel matrix constructed based on a codebook;
a singular value decomposition (SVD) calculator to calculate an SVD based on the sub-matrix; and
a steering matrix generator to calculate a steering matrix based on the SVD and the codebook.

14. The apparatus of claim 13, wherein the estimated MIMO channel matrix has three columns;
wherein the sub-matrix selector is configured to select two of the three columns of the estimated MIMO channel matrix.

15. The apparatus of claim 13, wherein the sub-matrix selector includes a QR decomposition calculator to generate an R matrix;
wherein the SVD calculator is configured to calculate an SVD of the R matrix.

16. The apparatus of claim 13, wherein the SVD calculator includes a correlation matrix calculator;
wherein the SVD calculator is configured to calculate an SVD of a correlation matrix corresponding to the sub-matrix.

17. The apparatus of claim 13, wherein the estimated MIMO channel matrix has four columns;
wherein the sub-matrix selector is configured to select two of the four columns of the estimated MIMO channel matrix to form a 2-column sub-matrix.

18. The apparatus of claim 13, wherein the estimated MIMO channel matrix has four columns, and wherein the sub-matrix selector is configured to:
select three columns of the estimated MIMO channel matrix;
calculate signal to noise ratio (SNR) values associated with the selected three columns of the estimated MIMO channel matrix; and
select two columns of the selected three columns of the estimated MIMO channel matrix based on the SNR values.

19. The apparatus of claim 13, wherein the sub-matrix selector is configured to select a 2-column sub-matrix.

20. The apparatus of claim 19, further comprising a QR decomposition processor to generate a 2×2 R matrix corresponding to the 2-column sub-matrix;
wherein the SVD calculator is configured to calculate an SVD of the R matrix.

21. The apparatus of claim 19, wherein the SVD calculator includes a correlation matrix calculator to calculate a correlation matrix based on the 2-column sub matrix;
wherein calculating the SVD based on the sub-matrix comprises calculating an SVD of the correlation matrix.

22. The apparatus of claim 13, wherein the sub-matrix selector is configured to:
select a column in the estimated MIMO channel matrix with the largest norm;
project each of the remaining columns in the estimated MIMO channel matrix to the null space spanned by the column in the estimated MIMO channel matrix with the largest norm; and
select a next column based on the projections of the remaining columns.

23. The apparatus of claim 13, further comprising a channel matrix estimator to construct the estimated MIMO channel matrix based on the codebook.

24. An apparatus, comprising:
a processor configured to:
select a sub-matrix from an estimated multiple input, multiple output (MIMO) channel matrix, wherein the estimated MIMO channel matrix constructed based on a codebook;
calculate a singular value decomposition (SVD) based on the sub-matrix; and
calculate a steering matrix based on the SVD and the codebook; and
a memory coupled to the processor.

25. The apparatus of claim 24, wherein the processor is further configured to construct the estimated MIMO channel matrix based on the codebook.

\* \* \* \* \*